July 2, 1935.  C. B. BAILEY  2,006,381
GASKET
Filed July 9, 1931
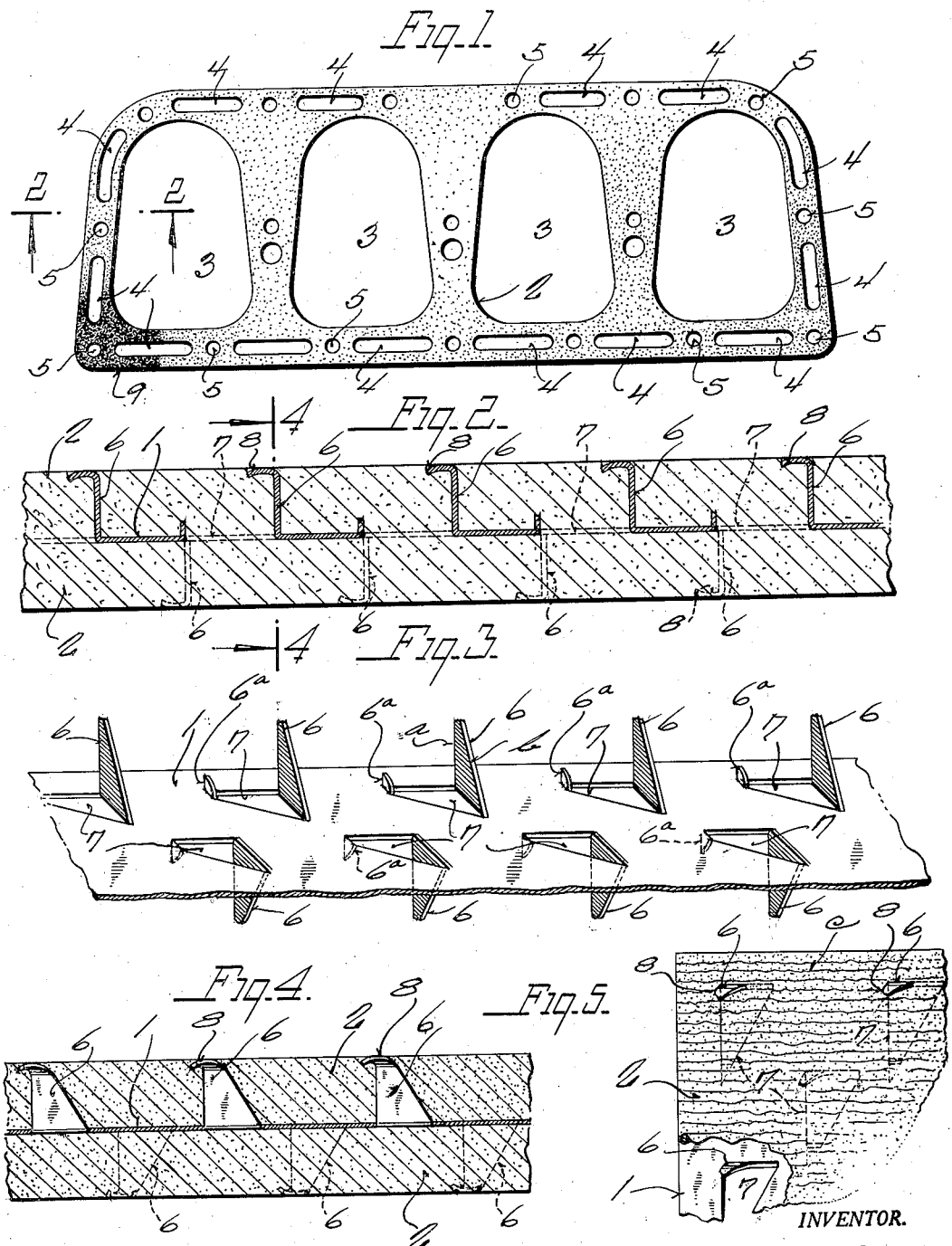
INVENTOR.
Claude B. Bailey
BY
Bottum, Hudnall, Locher,
McNamara & Michael
ATTORNEYS Patented July 2, 1935

2,006,381

UNITED STATES PATENT OFFICE 2,006,381

GASKET

Claude B. Bailey, Wyandotte, Mich., assignor to McCord Radiator & Mfg. Co., Detroit, Mich., a corporation of Maine Application July 9, 1931, Serial No. 549,602

1 Claim. (Cl. 288—1)

This invention relates to gaskets of the type having a metal insert forming the supporting layer for the cushion material on one or both sides of the gasket, with the insert provided with a multiplicity of projections or prongs struck out therefrom and extending into or through the cushion material to anchor and secure the same to the metal layer.

One object of my invention is to so form and arrange the prongs on the metal layer that when the layers of the gasket are pressed together to unite them, the outer ends of those prongs which extend through the cushion material will be turned over against the cushion material in a direction away from the openings made in the metal layer by striking out the prongs, to clinch the cushion material to the metal layer and provide a secure connection between them.

In carrying out this object, I make the prongs, which serve to clinch the cushion material to the metal layer, in the shape of right angle triangles so that the apexes or outer ends of said prongs when extended outward from the metal layer will be opposite one of the side edges of the openings formed in the metal layer on striking out said prongs. By this arrangement, the outer ends of said prongs when pressed toward the metal layer will bend or twist over beyond the adjacent sides of the openings to clinch the cushion material against the imperforate portions of the metal layer at the sides of the openings instead of toward the openings, as when the outer ends of the clinching prongs are disposed midway or between the side edges of the openings.

The invention also relates to the composite sheet from which the gaskets are made, and consists further in the matters hereinafter described and claimed.

In the accompanying drawing:—

Fig. 1 is a top plan view of a cylinder head gasket constructed in accordance with my invention;

Fig. 2 is an enlarged transverse sectional view taken on line 2—2 of Fig. 1;

Fig. 3 is a perspective view of the prong provided metal insert used in the gasket, the clinching prongs being shown with their outer or apex ends extending outward for passing through the cushion material;

Fig. 4 is a transverse sectional view taken on line 4—4 of Fig. 2; and

Fig. 5 is a top plan view of the structure shown in Fig. 4.

As shown in the drawing, the gasket comprises an intermediate supporting layer or insert 1 of sheet material, such as steel, and two cushion layers 2, 2 of asbestos or other fibrous heat resistant material on opposite sides of the metal layer and completely covering the same. When the gasket is of the cylinder head type, as shown in Fig. 1, the layers are provided with a plurality of registering openings 3, 4 and 5, respectively. These openings have the arrangement, size and shape required and constitute, in the order named, the combustion chamber openings, the water passage openings, and the stud or bolt openings, respectively. In any other type of gasket, the openings will have the size, shape and arrangement required.

To anchor and firmly secure the cushion layers 2 to the metal layer or insert 1, I provide the latter with a multiplicity of relatively narrow projections or prongs 6, 6ᵃ punched or struck out of the metal layer in rows on opposite sides of the same, as shown in Figs. 3 and 4. The prongs are preferably arranged in rows extending lengthwise of the metal layer with the prongs in one row staggered with respect to the prongs in an adjacent row. This provides an effective distribution of the prongs over both sides of the metal layer, although it is, of course, understood that my invention is applicable to a gasket in which the metal layer may form one of the faces for the cushion material and thus have prongs on one side only. The holes or apertures 7 made in the metal layer in the striking out of prongs 6, 6ᵃ permit the material forming the cushion layers to be pressed through the openings in the making of the gasket as when pressing the layers together. This provides for more or less homogenous connection between the cushion layers on opposite sides of metal layers through holes 7, as shown in Fig. 2.

Certain of the prongs on opposite sides of the metal layer serve to clinch the cushion material thereto, in order to more effectually anchor or secure the layers together. This is rendered possible by making certain of the prongs longer than the others, the long prongs extending through the cushion material and having their outer ends clinched over against the same in the making of the gasket. In the drawing, I show the prongs 6, 6ᵃ in each row alternately long and short, with a short prong 6ᵃ at one end of each opening 7 and a long prong 6 at the opposite end of the opening. It is preferable, although not necessary, to have a long prong 6 in each row followed by a short prong 6ᵃ in the same row, so that two long prongs are not near enough to hinder or interfere with the bending of the outer ends of such prongs into clinching relation with the cushion material engaged thereby.

The long prongs 6 are preferably made in the form of right angle triangles. This causes the outer or apex ends of such prongs to be substantially over one of the side edges of the openings 7, from which the prongs extend. Moreover, the long prongs 6 are long enough to extend through the cushion material, and in the making of the gasket the outer or apex ends of the long prongs extend slightly beyond the outer surfaces of the cushion layers when the layers are pressed together. With the outer ends of the long prongs projecting beyond the cushion layers, the long prongs may be operated upon by pressure when pressing the layers together to twist or bend the apexes of the long prongs over and against the outer surfaces of the cushion layers to clinch the layers together, as indicated by 8 in Fig. 2. With the outer or apex ends of the long prongs disposed at one side of their respective openings, the outer ends of such prongs under pressure not only flatten over into clinching contact with the cushion material, but turn or bend over in a direction away from the adjacent side edges of the openings 7 to clinch the cushion material against the imperforate portions of the metal layer at the sides of the openings. This accomplishes a more effective anchoring of the cushion material to the metal layer than in those cases where the outer or apex ends of the clinching prongs are between the side edges of the openings and merely curl or bend back against the cushion material over and in line with the openings where the metal layer provides no support for the cushion material or resists the clinching action of the prongs. With the long prongs 6 in the shape of right angle triangles, the bending over of the outer or apex ends of the prongs beyond the sides of the openings 7 will be assured on the application of an inward pressure on the prongs, due to the fact that the vertical edges $a$ of the prongs will resist this pressure to a greater extent than the longer inclined edges $b$, and the latter will give and direct the outer ends of the prongs beyond the vertical edges $a$, as shown at 8.

An effective anchoring of the cushion material to the metal layer 1 can be secured if the cushion material is disposed on the metal layer with the long prongs arranged to extend into and through the cushion material at right angles or transverse to the general direction of the fibres or grain of the cushion material, as indicated in Fig. 5, the grain being designated by $c$. It will be observed from an inspection of this figure that the outer or apex ends 8 of the prongs are twisted or bent against the cushion material and extend crosswise of the grain or fibres.

The cushion material 2 may be applied to metal layer 1 in the form of previously made sheets or in moist paste form. When the cushion material is in self-supporting form, the sheets are disposed on opposite sides of the metal layer and all are subject to required inward pressure to assemble the layers and to cause the prongs to penetrate the cushion layers with the long prongs passing through the cushion material for clinching against the same. When the cushion material is in paste form, it is usually spread over opposite sides of the metal layer to the thickness required and pressure applied to compact the material and to clinch over the outer or apex ends of the long prongs. Regardless of the manner in which the cushion material is applied to the metal layer, the prongs will be embedded in the cushion material, the long prongs serving to clinch the cushion material to the metal layer. The composite sheet material so formed is afterward cut or blanked to the shape and size required, with the necessary arrangement of port and other holes or openings for gasket purposes.

The metal layer 1 provides an effective support for the cushion layers on opposite sides of the metal layer. The exposed faces of the gasket are formed of the yieldable cushion material, which is pressed into the irregularities of the surfaces of the members between which the gasket is clamped to provide a leakproof joint at such members. To keep the cushion material from adhering to such surfaces, the outer faces of the cushions are coated with graphite or the like, as indicated at 9, in Fig. 1.

The short prongs 6ª provide abutments which, in conjunction with the long prongs, prevent displacement of the cushion material in the plane of the layers. The short prongs also serve to anchor the layers together by extending into the cushion material. The edges of the cushion material at the combustion chamber and water passage openings of the gasket may be bound with metal inserts, if required.

The details of the structure and arrangement of parts shown and described may be variously changed and modified without departing from the spirit and scope of my invention, except as pointed out in the appended claim.

I claim as my invention:

A gasket of the character described having a layer of cushion gasket material and a layer of sheet metal substantially co-extensive with the cushion layer, said metal layer having a multiplicity of short and long prongs struck out from the metal layer on opposite sides thereof and extending into the cushion layer, the short prongs being at one end of each of the openings made in the metal layer on striking out the prongs and terminating short of the outer surface of the cushion layer, the long prongs being at the other ends of the openings and having a length sufficient to extend through the cushion layer and beyond the outer surface thereof, the outer ends of the long prongs being deflected laterally of the prongs and bent into clinching engagement with the cushion layer on the outer surface thereof laterally of the openings in the metal layer to secure the cushion layer to the imperforate portion of the metal layer at the sides of the prongs, the long and the short prongs by extending into the cushion layer holding said layer against displacement in the plane of the metal layer.

CLAUDE B. BAILEY.